(12) United States Patent
Guerif et al.

(10) Patent No.: US 11,831,057 B2
(45) Date of Patent: Nov. 28, 2023

(54) METHOD OF INTEGRATING A FUEL CELL WITH A STEAM METHANE REFORMER

(71) Applicants: L'Air Liquide, Société Anonyme pour l'Etude et l'Exploitation des Procédés Georges Claude, Paris (FR); Pierre-Philippe Guerif, Houston, TX (US); Guillaume Rodriges, Le Plessis Trevise (FR)

(72) Inventors: Pierre-Philippe Guerif, Houston, TX (US); Guillaume Rodriges, Le Plessis Trevise (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 265 days.

(21) Appl. No.: 17/416,334

(22) PCT Filed: Dec. 18, 2019

(86) PCT No.: PCT/US2019/067022
§ 371 (c)(1),
(2) Date: Jun. 18, 2021

(87) PCT Pub. No.: WO2020/131981
PCT Pub. Date: Jun. 25, 2020

(65) Prior Publication Data
US 2022/0200028 A1    Jun. 23, 2022

Related U.S. Application Data

(60) Provisional application No. 62/781,310, filed on Dec. 18, 2018.

(51) Int. Cl.
*H01M 8/0612* (2016.01)
*C01B 3/48* (2006.01)
(Continued)

(52) U.S. Cl.
CPC .............. *H01M 8/0618* (2013.01); *C01B 3/48* (2013.01); *C01B 3/501* (2013.01);
(Continued)

(58) Field of Classification Search
CPC .............. H01M 8/0618; H01M 8/0637; H01M 8/0668; H01M 8/0675; C01B 3/48;
(Continued)

(56) References Cited

U.S. PATENT DOCUMENTS

2003/0143448 A1     7/2003  Keefer
2004/0224193 A1 *  11/2004  Mitlitsky .......... H01M 8/04925
                                                          429/495
(Continued)

FOREIGN PATENT DOCUMENTS

DE   102008008907 A1 *  8/2009   .......... H01M 8/0618
JP   2003 036876        2/2003

OTHER PUBLICATIONS

Machine Translation of DE-102008008907-A1 (Jul. 19, 2023) (Year: 2023).*

(Continued)

*Primary Examiner* — Matthew J Merkling
(74) *Attorney, Agent, or Firm* — Elwood L. Haynes (57) ABSTRACT

A method of integrating a fuel cell with a steam methane reformer is provided. The system includes at least one fuel cell including an anode and a cathode, and a steam methane reformer including a syngas stream, and a flue gas stream. The method includes introducing at least a portion of the flue gas stream to the cathode, thereby producing a CO2 depleted flue gas stream and introducing a hydrocarbon containing stream to the anode, thereby producing an electrical energy output and a carbon dioxide and hydrogen containing stream from the fuel cell.

5 Claims, 6 Drawing Sheets

(51) Int. Cl.
*C01B 3/50* (2006.01)
*H01M 8/0637* (2016.01)
*H01M 8/0668* (2016.01)
*H01M 8/0662* (2016.01)

(52) U.S. Cl.
CPC ....... *H01M 8/0637* (2013.01); *H01M 8/0668* (2013.01); *H01M 8/0675* (2013.01); *C01B 2203/0216* (2013.01); *C01B 2203/0283* (2013.01); *C01B 2203/0405* (2013.01); *C01B 2203/067* (2013.01); *C01B 2203/1241* (2013.01); *C01B 2203/14* (2013.01)

(58) Field of Classification Search
CPC ............ C01B 3/501; C01B 2203/0216; C01B 2203/0283; C01B 2203/0405; C01B 2203/067; C01B 2203/1241; C01B 2203/14

See application file for complete search history.

(56) References Cited

U.S. PATENT DOCUMENTS

| | | | |
|---|---|---|---|
| 2014/0260798 A1* | 9/2014 | Berlowitz | C01B 3/34 75/392 |
| 2014/0272618 A1* | 9/2014 | Berlowitz | C10G 2/32 429/410 |
| 2014/0272624 A1* | 9/2014 | Berlowitz | H01M 8/04843 429/411 |
| 2014/0272641 A1* | 9/2014 | Berlowitz | H01M 8/0687 429/420 |
| 2015/0089951 A1* | 4/2015 | Barckholtz | F01D 13/00 60/772 |
| 2016/0293985 A1* | 10/2016 | Berlowitz | C10G 2/34 |
| 2016/0351931 A1* | 12/2016 | Berlowitz | H01M 8/0662 |
| 2019/0296375 A1* | 9/2019 | Taku | H01M 8/04 |

OTHER PUBLICATIONS

Campanari, S. et al., Using MCFC for high efficiency $CO_2$ capture from natural gas combined cycles: Comparison of internal and external reforming, Applied Energy 112 (2013), 772-783.

International Search Report and Written Opinion for corresponding PCT/US2019/067022, dated Apr. 23, 2020.

* cited by examiner

METHOD OF INTEGRATING A FUEL CELL WITH A STEAM METHANE REFORMER

CROSS REFERENCE TO RELATED APPLICATIONS

This application is a 371 of International PCT Application PCT/US2019/067022, filed Dec. 18, 2019, which claims priority to U.S. Patent Application No. 62/781,310, filed Dec. 18, 218, the entire contents of which are incorporated herein by reference.

BACKGROUND

In typical electrical generation, a fuel is burned, and the heat is then converted into electricity. Fuel cells are entirely different. In a fuel cell, a chemical process is used to convert hydrogen-rich fuel into electricity. A highly convenient and appealing aspect of fuel cells is that they do not need to be periodically recharged like batteries, but instead continue to produce electricity as long as a fuel source is provided.

There are a variety of different specific fuel cell designs, but typically, a fuel cell consists of two electrodes, a negative electrode (or anode) and a positive electrode (or cathode) sandwiched around an electrolyte. Within the fuel cell, a hydrogen-rich stream is passed through the anode and an oxygen-rich stream is passed through the cathode. Along the anode, the hydrogen molecules are split into electrons and protons. The protons pass through the electrolyte membrane, while the electrons are forced through a circuit, generating an electric current and excess heat. Along the cathode, the protons, electrons, and oxygen combine to produce water molecules.

Due to their high efficiency, fuel cells are very clean, with their only by-products being electricity, excess heat, and water. In addition, as fuel cells do not have any moving parts, they operate near-silently.

SUMMARY

A method of integrating a fuel cell with a steam methane reformer is provided. The system includes at least one fuel cell 100 including an anode 104 and a cathode 103, and a steam methane reformer 114 including a syngas stream 305, and a flue gas stream 101. The method includes introducing at least a portion of the flue gas stream 101 to the cathode 103, thereby producing a CO2 depleted flue gas stream 112 and introducing a hydrocarbon containing stream 303 to the anode 104, thereby producing an electrical energy output 107 and a carbon dioxide and hydrogen containing stream 307 from the fuel cell 100.

In one embodiment of the present invention, the method further includes separating a hydrogen-rich stream 306 from the carbon dioxide and hydrogen containing stream 307, thereby producing a carbon dioxide rich stream 111 combining the hydrogen-rich stream 306 with the syngas stream 305, thereby producing a combined syngas stream, and introducing the combined syngas stream into a hydrogen separation device 115, thereby producing a second high purity hydrogen stream 116.

In another embodiment of the present invention, the method further includes introducing at least a portion of syngas stream 305 into hydrogen separation device 115, thereby producing a high purity hydrogen stream 116, separating a hydrogen-rich stream 306 from the carbon dioxide and hydrogen containing stream 307, thereby producing a carbon dioxide rich stream 111, and introducing the hydrogen-rich stream 306 into a second hydrogen separation device 401, thereby producing a second high purity hydrogen stream 402.

In another embodiment of the present invention, the method further includes combining at least a portion of the carbon dioxide and hydrogen containing stream 502 with the syngas stream 304, thereby producing a combined syngas stream, separating a hydrogen-rich stream 306 from the combined syngas stream, thereby producing a carbon dioxide rich stream 111, and introducing the hydrogen-rich stream 306 into a hydrogen separation device 115, thereby producing a high purity hydrogen stream 116.

In another embodiment of the present invention, the method further includes combining at least a portion of the hydrogen-rich stream 502 with the syngas stream 304, thereby producing a first combined syngas stream, combining the first combined syngas stream with a hydrogen rich purge stream 601, thereby producing a second combined syngas stream, introducing the second combined syngas stream into a hydrogen separation device 115, thereby producing a high purity hydrogen stream 116, and a tail gas stream 117, and separating a hydrogen rich purge stream 601 from the tail gas stream 117, thereby producing at least a carbon dioxide rich stream 111, and the hydrogen rich purge stream 601.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

ELEMENT NUMBERS

100=fuel cell
101=flue gas stream
102=oxidizer (optional)
103=fuel cell cathode
104=fuel cell anode
105=natural gas stream
106=desulfurizer (optional)
107=electrical production from fuel cell
108=water-gas shift converter
109=compressor
110=carbon dioxide/hydrogen separation unit
111=high purity carbon dioxide stream
112=CO2-depleted flue gas stream
113=steam methane reformer burners 114=steam methane reformer
115=pressure swing adsorption unit
116=high purity hydrogen stream
117=tail gas (from pressure swing adsorption unit)
301=natural gas stream to SMR burners
302=natural gas stream to SMR (process stream)
303=natural gas stream to fuel cell anode
304=raw syngas stream (from SMR)
305=shifted syngas stream (from water-gas shift converter)
306=hydrogen-rich stream (from carbon dioxide/hydrogen separation unit)
307=CO2-rich stream (from fuel cell anode)
308=shifted CO2-rich stream (from fuel cell anode)
401=second pressure swing adsorption unit
402=second high purity hydrogen stream (from second pressure swing adsorption unit)
501=compressed, non-shifted stream (from fuel cell anode)

DETAILED DESCRIPTION OF THE PREFERRED EMBODIMENTS

The integration of a fuel cell system with the flue gas of a coal or natural gas power plant has already been studied extensively. Typically, after a first purification step to remove harmful impurities for the fuel cell such as sulfur compounds or halides, the flue gas is preheated in an oxidizer before entering the cathode.

The $O_2$ and the $CO_2$ present in the flue gas stream will be reduced into ions $CO_3^{2-}$ following the reaction:

$$1/2 O_2 + CO_2 + 2e^- = CO_3^{2-}$$

The ions $CO_3^{2-}$ will be transferred to the anode side via the electrolyte. On the anode side, natural gas is injected with steam so that a reforming reaction will happen:

$$CH_4 + H_2O = CO + 3H_2$$

The $H_2$ produced will then react with the $CO_3^{2-}$ ions via the following reaction:

$$H_2 + CO_3^{2-} = CO_2 + H_2O + 2e^-$$

Figure 1:
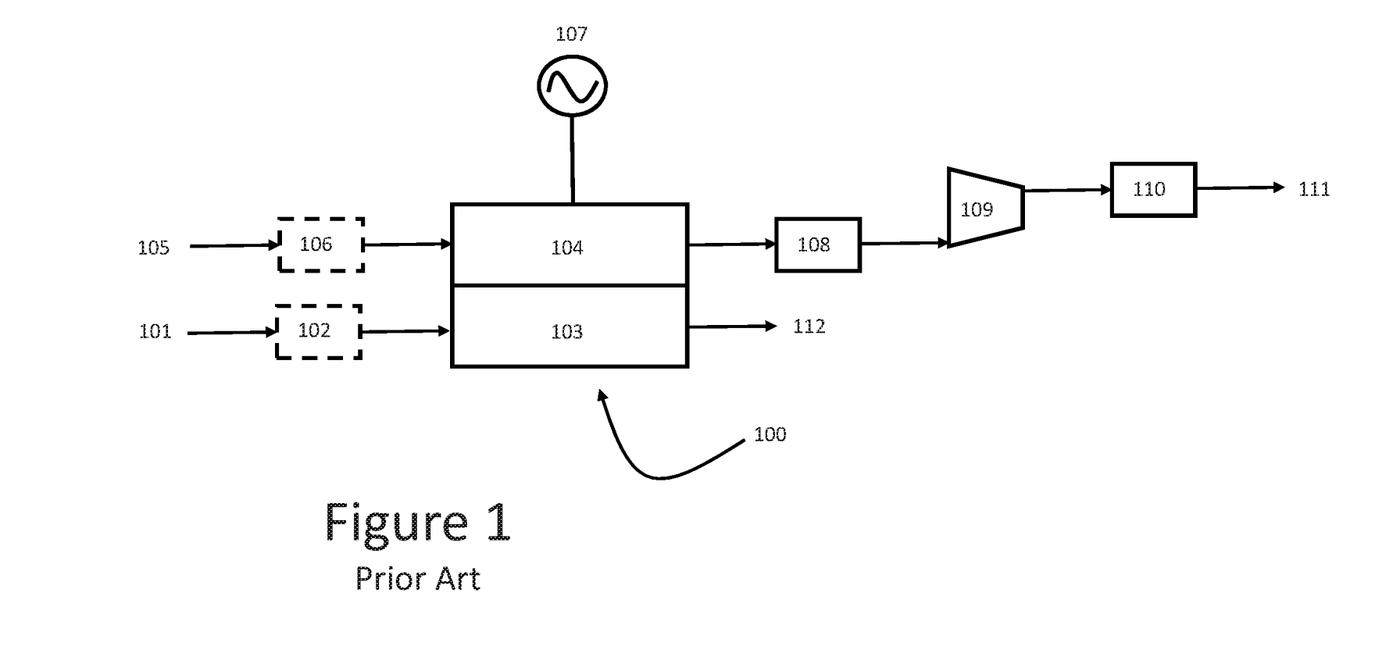
FIG. 1 is a schematic representation of a typical fuel cell system as known to the art.

Referring to FIG. 1, a typical fuel cell system design is illustrated. As disclosed in, for example, U.S. Pat. Nos. 7,396,603; 7,060,382, and Japanese Patent 61085773, flue gas stream 101, which may be provided by a hydrocarbon-fueled powerplant, is optionally preheated in oxidizer 102, before entering cathode 103, and as discussed above, produces $CO_2$ depleted flue gas stream 112. $CO_2$ from the flue gas 101 (in the form of $CO_3^{2-}$ as discussed above) is transferred to anode 104. Meanwhile, natural gas stream 105 is optionally desulfurized 106, before entering anode 104. Then, by way of the above reactions, the system generates electricity 107. The gas stream exiting the outlet of anode 104 may then be sent to water-gas shift converter 108 to convert the remaining CO and water to $H_2$ and $CO_2$. The gas stream exiting the outlet of water-gas shift converter 108 may compressed in compressor 109 and then be sent to $CO_2/H_2$ separation unit 110 which is typically a cryogenic unit to recover high purity $CO_2$ stream 111 in a liquid or gaseous phase.

High purity $CO_2$ stream 111 may be used for enhanced oil recovery, carbon capture and storage, or even for liquid merchant application after further treatment. If a cryogenic unit is utilized as $CO_2/H_2$ separation unit 110, there typically will be a purge stream that contains some hydrogen. This stream may be sent back to the anode inlet or is burnt in the oxidizer at the cathode inlet (not shown).

Figure 2:
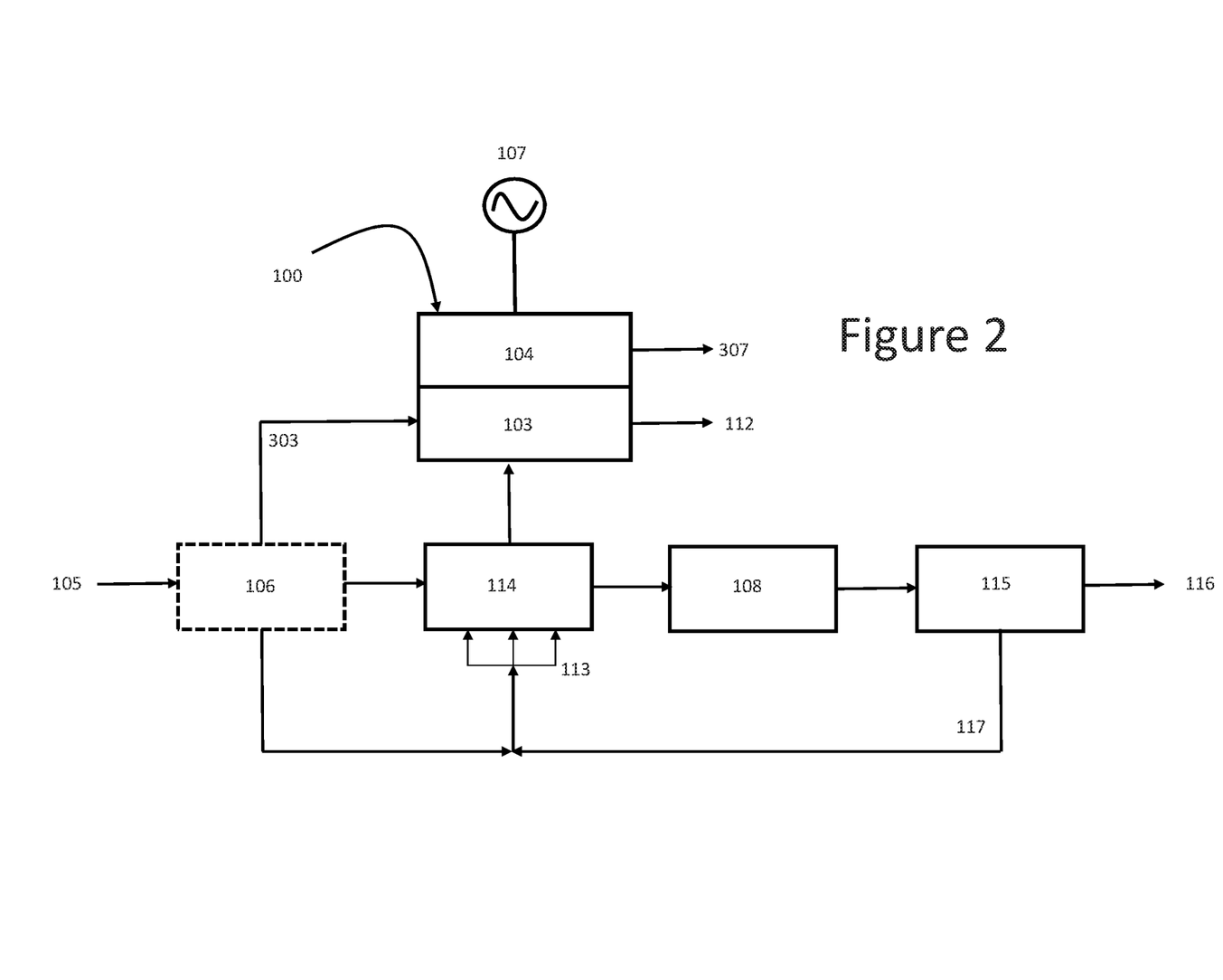
FIG. 2 is simplified drawing illustrating the basic design in accordance with one embodiment of the present invention.

Referring to FIG. 2, a simplified diagram exemplifying the basic integration of the present invention is illustrated. For convenience and to avoid confusion, and as the overall intent of the instant application is system integration, when applicable, element which serve a common purpose will be indicated with the same element numbers. The present invention is looking at integration improvements between a Steam Methane Reformer (SMR) and a fuel cell system to be implemented on the flue gas of the SMR in order to capture the $CO_2$. The feedstock considered is natural gas for both the SMR and the fuel cell.

If there is sufficient sulfur content in the natural gas to be a concern for the fuel cell, it is possible to send the natural gas to be used at the SMR burners 113 and as a feedstock to anode 104 to (optional) desulfurizer 106. If sufficient sulfur is present in the natural gas feed, it will turn into $SO_x$ during the combustion at SMR burners 113 and will thus be present in the SMR flue gas. In case of an integration with a fuel cell, as at least a portion of the natural gas is also used in anode 104, it may be of interest to have a common desulfurization unit 106 with the reforming section of SMR 114, SMR burners 113, and anode 104. It will allow to avoid a costly SOx removal system to be implemented on the SMR flue gas 101 before entering the cathode 103.

Thus, natural gas stream 105 is (optionally) introduced into desulfurization unit 106. Natural gas stream 105 is split into three streams, one which enters SMR burners 113, one which enters SMR 114 as a process stream, and one which enters fuel cell 100. The syngas stream exiting SMR 114 then enters water-gas shift converter 108, and then pressure swing adsorber (PSA) 115. PSA 115 thereby produces high purity hydrogen stream 116 and tail gas stream 117. Tail gas stream 117, from PSA 115, may be combined with NG stream 105 and used as fuel to SMR burners 113.

Figure 3:
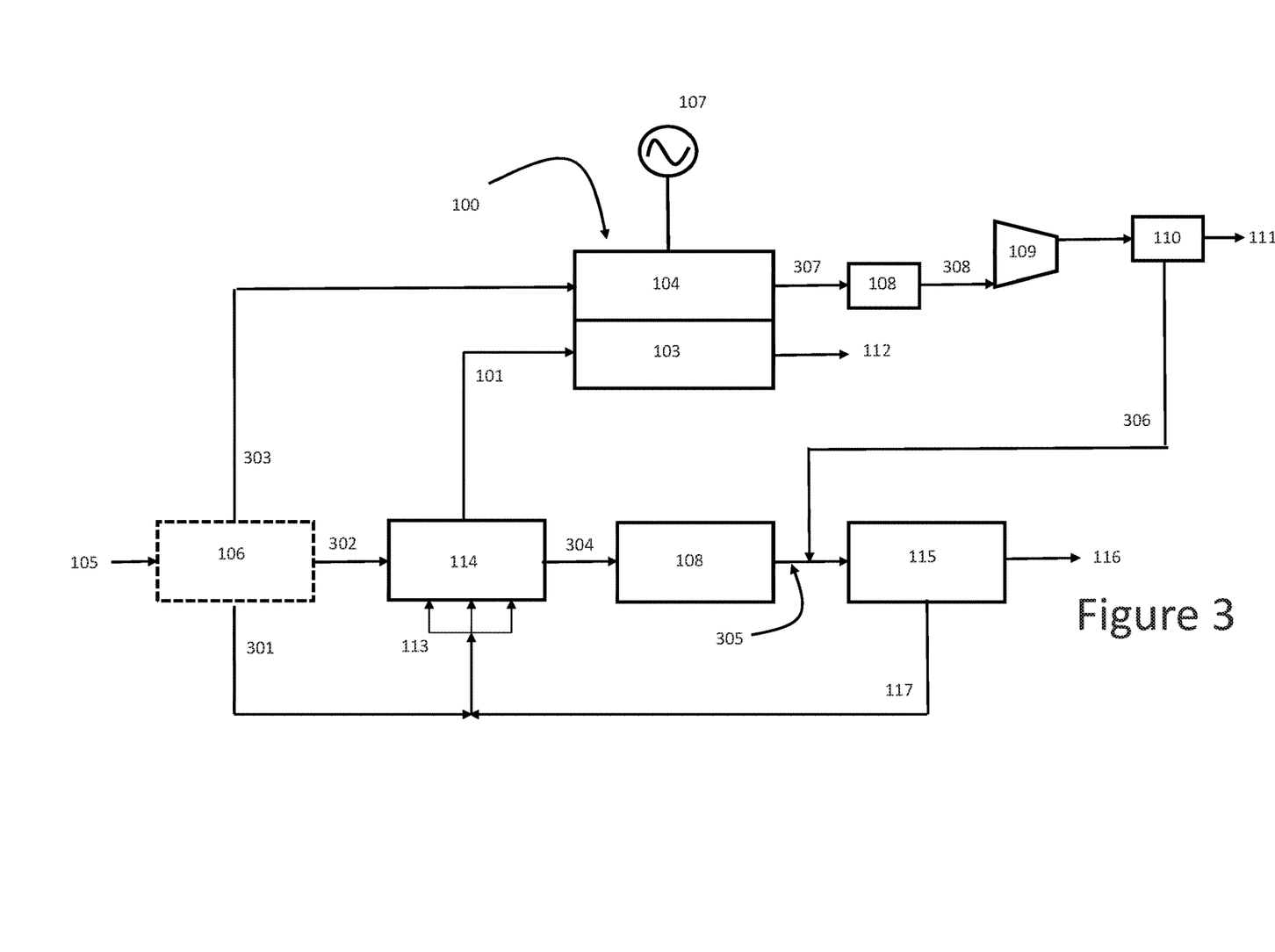
FIG. 3 is a schematic representation of one embodiment in accordance with one embodiment of the present invention.

Turning now to FIG. 3, one embodiment of the present invention is provided. Natural gas stream 105 is (optionally) introduced into desulfurization unit 106. Natural gas stream 105 is then split into three streams. Stream 301 enters SMR burners 113, stream 302 enters SMR 114 as a process stream, and stream 303 enters fuel cell anode 104. Raw syngas stream 304 exiting SMR 114 then enters water-gas shift converter 108. Shifted syngas stream 305 is combined with hydrogen-rich stream 306 (discussed below), and the combined stream is introduced into pressure swing adsorber (PSA) 115. PSA 115 thereby produces high purity hydrogen stream 116 and tail gas stream 117. Tail gas stream 117 may be combined with NG stream 301 and used as fuel to SMR burners 113.

Flue gas stream 101 is introduced into cathode 103 and produces $CO_2$ depleted flue gas stream 112. $CO_2$ from the flue gas 101 (in the form of $CO_3^{2-}$ as discussed above) is transferred to anode 104. Meanwhile, natural gas stream 303 is introduced into anode 104. Fuel cell 100 thus produces electricity 107 and $CO_2$-rich stream 307. $CO_2$-rich stream 307 is then sent to water-gas shift converter 108 to convert the remaining CO and water to $H_2$ and $CO_2$, thus producing shifted $CO_2$-rich stream 308. Shifted $CO_2$-rich stream 308 is then compressed in compressor 109 and then be sent to $CO_2/H_2$ separation unit 110. $CO_2/H_2$ separation unit 110 may be any appropriate system known to the art. $CO_2/H_2$ separation unit 110 may be a cryogenic unit to recover high purity $CO_2$ stream 111 in a liquid or gaseous phase. If a cryogenic unit is utilized as $CO_2/H_2$ separation unit 110, there is a H2-rich purge stream 306. As discussed above, H2-rich purge stream 306 is combined with shifted syngas stream 305, and the combined stream is introduced into PSA 115.

Figure 4:
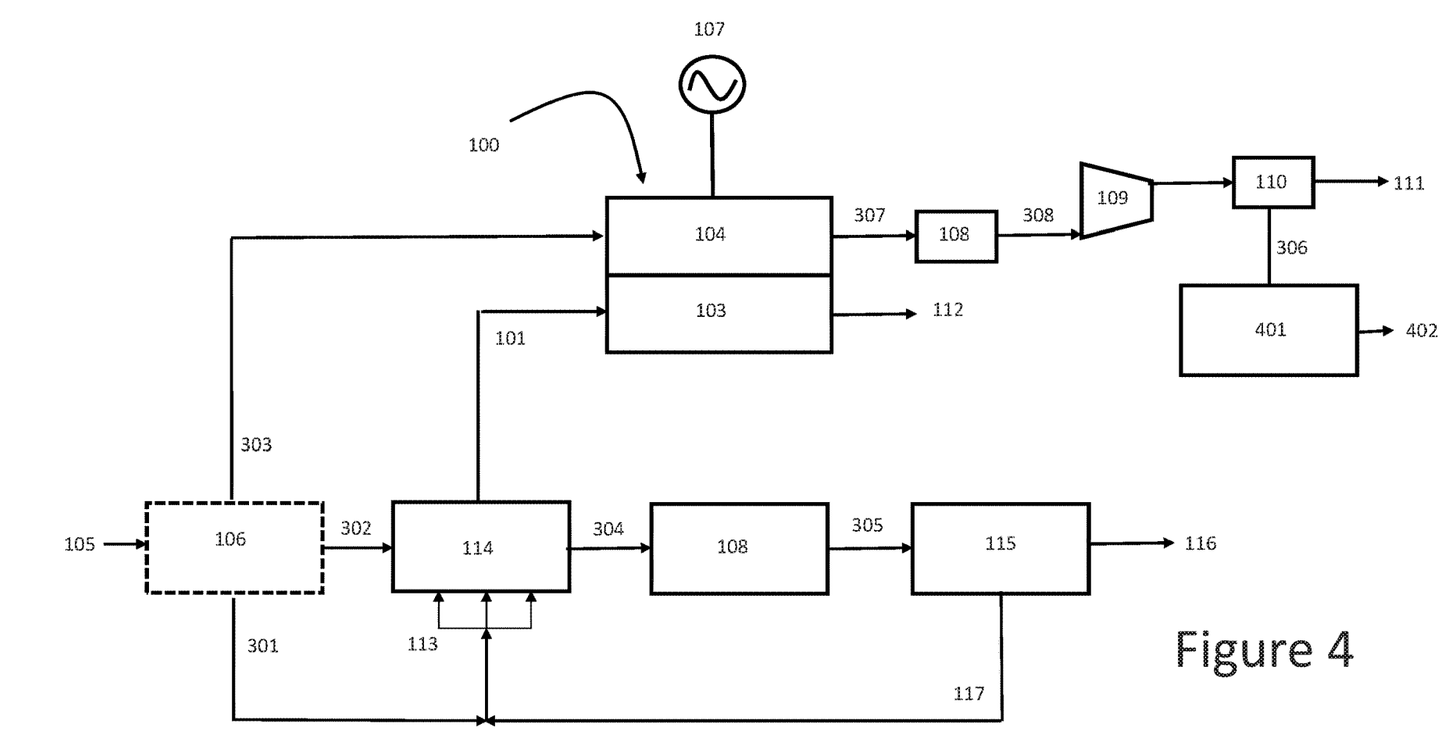
FIG. 4 is a schematic representation of another embodiment in accordance with one embodiment of the present invention.

Turning now to FIG. 4, another embodiment of the present invention is provided. Natural gas stream 105 is (optionally) introduced into desulfurization unit 106. Natural gas stream 105 is then split into three streams. Stream 301 enters SMR burners 113, stream 302 enters SMR 114 as a process stream, and stream 303 enters fuel cell 100. Raw syngas stream 304 exiting SMR 114 then enters water-gas shift converter 108. Hydrogen-rich stream 305 is introduced into PSA 115. PSA 115 thereby produces high purity hydrogen stream 116 and tail gas stream 117. Tail gas stream 117 may be combined with NG stream 301 and used as fuel to SMR burners 113.

Flue gas stream 101 is introduced into cathode 103 and produces $CO_2$ depleted flue gas stream 112. $CO_2$ from the flue gas 101 (in the form of $CO_3^{2-}$ as discussed above) is transferred to anode 104. Meanwhile, natural gas stream 303 is introduced into anode 104. Fuel cell 100 thus produces electricity 107 and $CO_2$-rich stream 307. $CO_2$-rich stream 307 is then sent to water-gas shift converter 108 to convert the remaining CO and water to $H_2$ and $CO_2$, thus producing shifted $CO_2$-rich stream 308. Shifted $CO_2$-rich stream 308 is then compressed in compressor 109 and then be sent to $CO_2/H_2$ separation unit 110. $CO_2/H_2$ separation unit 110 may be any appropriate system known to the art. $CO_2/H_2$ separation unit 110 may be a cryogenic unit to recover high purity $CO_2$ stream 111 in a liquid or gaseous phase. If a cryogenic unit is utilized as $CO_2/H_2$ separation unit 110, there is a H2-rich purge stream 306. H2-rich purge stream 306 is introduced into second PSA 401, thus producing second high purity hydrogen stream 402.

Figure 5:
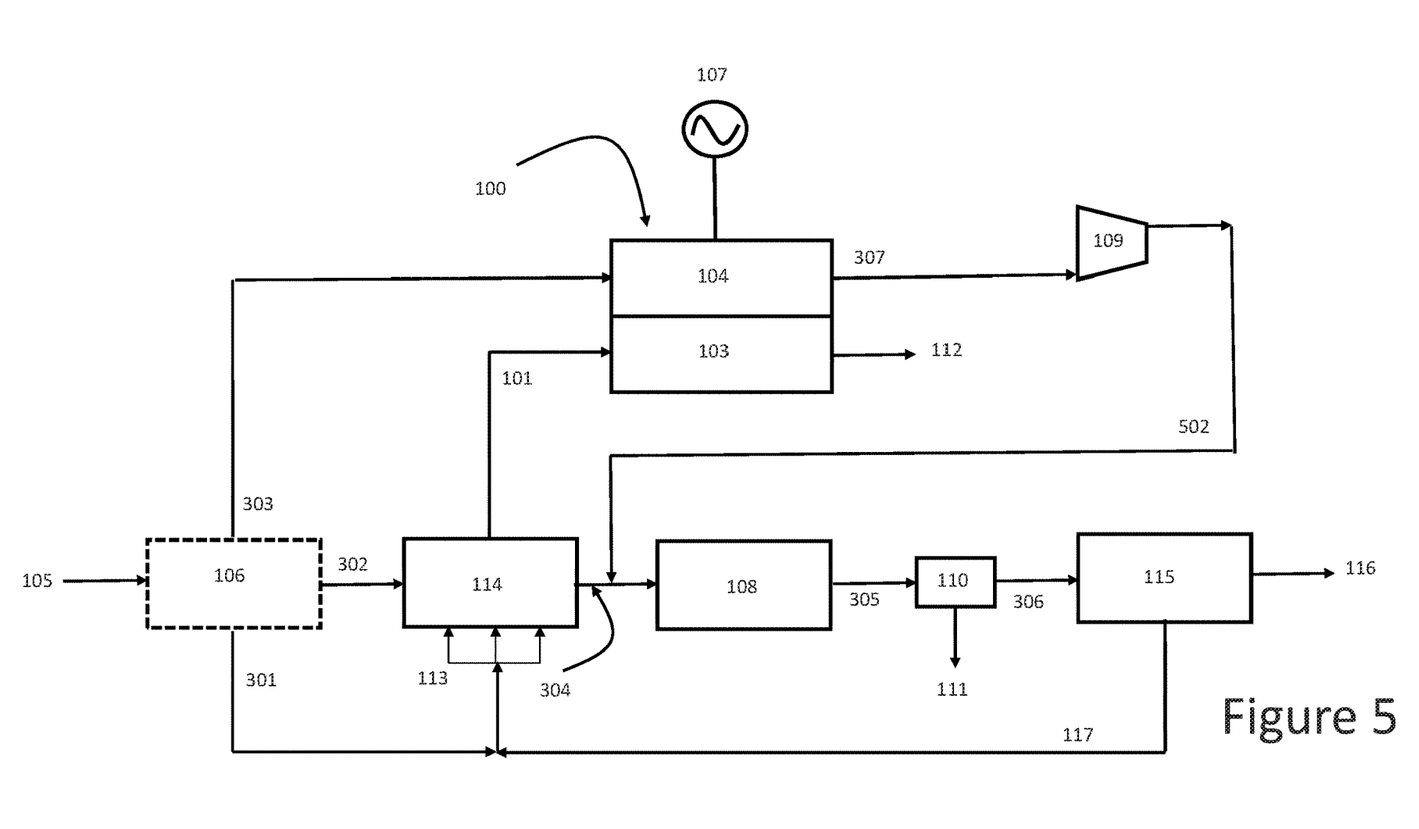
FIG. 5 is a schematic representation of another embodiment in accordance with one embodiment of the present invention.

Turning now to FIG. 5, another embodiment of the present invention is provided. Natural gas stream 105 is (optionally) introduced into desulfurization unit 106. Natural gas stream 105 is then split into three streams. Stream 301 enters SMR burners 113, stream 302 enters SMR 114 as a process stream, and stream 303 enters fuel cell 100. Raw syngas stream 304 exiting SMR 114 is combined with compressed CO2-rich stream 502 (discussed below), and the combined stream is introduced into water-gas shift converter 108, thus producing hydrogen-rich stream 305. Hydrogen-rich stream 305 is sent to $CO_2/H_2$ separation unit 110 which is typically a cryogenic unit to recover high purity $CO_2$ stream 111 in a liquid or gaseous phase. Other technologies such as amine can be considered for the unit 110. From the $CO_2/H_2$ separation unit 110, there is a H2-rich purge stream 306. H2-rich purge stream 306 is introduced into PSA 115, thus producing high purity hydrogen stream 116 and tail gas stream 117. Tail gas stream 117 may be combined with NG stream 301 and used as fuel to SMR burners 113.

Flue gas stream 101 is introduced into cathode 103 and produces $CO_2$ depleted flue gas stream 112. $CO_2$ from the flue gas 101 (in the form of $CO_3^{2-}$ as discussed above) is transferred to anode 104. Meanwhile, natural gas stream 303 is introduced into anode 104. Fuel cell 100 thus produces electricity 107 and $CO_2$-rich stream 307. $CO_2$-rich stream 307 is compressed in compressor 109. Compressed CO2-rich stream 502 is then combined with raw syngas stream 304, as discussed above, and the combined stream is sent to water-gas shift converter 108. Stream 502 will be injected between the SMR 114 and the shift 108 where the overall heat integration makes the most sense.

Figure 6:
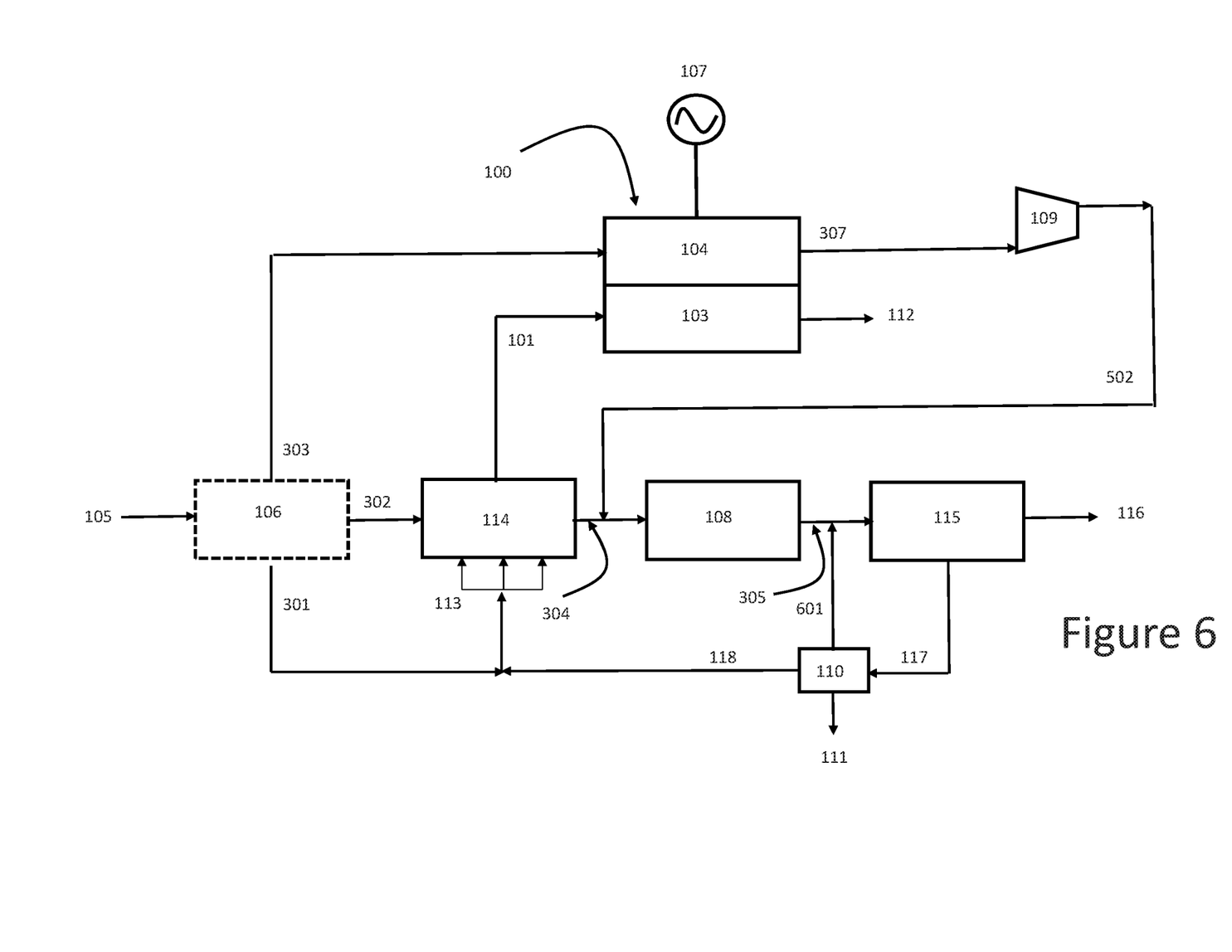
FIG. 6 is a schematic representation of another embodiment in accordance with one embodiment of the present invention.

Turning now to FIG. 6, another embodiment of the present invention is provided. Natural gas stream 105 is (optionally) introduced into desulfurization unit 106. Natural gas stream 105 is then split into three streams. Stream 301 enters SMR burners 113, stream 302 enters SMR 114 as a process stream, and stream 303 enters fuel cell 100. Raw syngas stream 304 exiting SMR 114 is combined with compressed CO2-rich stream 502 (discussed below), and the combined stream is introduced into water-gas shift converter 108, thus producing hydrogen-rich stream 305. Hydrogen-rich stream 305 is combined with hydrogen rich purge stream 601, and the combined stream is introduced into PSA 115, thus producing high purity hydrogen stream 116 and tail gas stream 117. Tail gas stream 117 is introduced into $CO_2/H_2$ separation unit 110 which is typically a cryogenic unit to recover high purity $CO_2$ stream 111 in a liquid or gaseous phase. If a cryogenic unit is utilized as $CO_2/H_2$ separation unit 110, H2-rich purge stream 601 (discussed above) and another purge stream 118 containing other components such as CO, CH4 and water are produced.

Flue gas stream 101 is introduced into cathode 103 and produces $CO_2$ depleted flue gas stream 112. $CO_2$ from the flue gas 101 (in the form of $CO_3^{2-}$ as discussed above) is transferred to anode 104. Meanwhile, natural gas stream 303 is introduced into anode 104. Fuel cell 100 thus produces electricity 107 and $CO_2$-rich stream 307. $CO_2$-rich stream 307 is then sent to compressor 109. Compressed CO2-rich stream 502 is then combined with raw syngas stream 304, as discussed above, and the combined stream is sent to water-gas shift converter 108.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of integrating a fuel cell with a steam methane reformer, comprising;
   at least one fuel cell 100 comprising an anode 104 and a cathode 103,
   a steam methane reformer 114 comprising a syngas stream 305, and a flue gas stream 101,
   the method comprising;
   a) introducing at least a portion of the flue gas stream 101 to the cathode 103, thereby producing a CO2 depleted flue gas stream 112
   b) introducing a hydrocarbon containing stream 303 to the anode 104, thereby producing an electrical energy output 107 and a carbon dioxide and hydrogen containing stream 307 from the fuel cell 100,
   c) separating a hydrogen-rich stream 306 from the carbon dioxide and hydrogen containing stream 307, thereby producing a carbon dioxide rich stream 111,
   d) combining the hydrogen-rich stream 306 with the syngas stream 305, thereby producing a combined syngas stream, and
   e) introducing the combined syngas stream into a hydrogen separation device 115, thereby producing a second high purity hydrogen stream 116.

2. The method of claim 1, wherein the hydrocarbon containing stream 303 is natural gas.

3. The method of claim 1, wherein the hydrocarbon containing stream is desulfurized prior to introduction into the anode 104.

4. The method of claim 1, wherein the carbon dioxide and hydrogen containing stream 307 passes through a water-gas shift reactor 108 between steps b) and c).

5. The method of claim 1, wherein the syngas stream 305 has passed through a water-gas shift reactor 108 prior to step d).

\* \* \* \* \*